United States Patent
Weinberg et al.

(10) Patent No.: US 7,979,472 B2
(45) Date of Patent: Jul. 12, 2011

(54) METHOD FOR CONDITIONALLY BRANCHING A VALIDATION

(75) Inventors: Paul Weinberg, Los Angeles, CA (US); Rich Endo, Los Angeles, CA (US); Wenphing Lo, Alhambra, CA (US)

(73) Assignee: SAP AG, Walldorf (DE)

( * ) Notice: Subject to any disclaimer, the term of this patent is extended or adjusted under 35 U.S.C. 154(b) by 1567 days.

(21) Appl. No.: 11/193,014

(22) Filed: Jul. 29, 2005

(65) Prior Publication Data

US 2007/0028079 A1 Feb. 1, 2007

(51) Int. Cl.
*G06F 7/00* (2006.01)
*G06F 17/30* (2006.01)
*G06F 13/16* (2006.01)

(52) U.S. Cl. .................... 707/802; 707/790

(58) Field of Classification Search ........... 707/999.101, 707/999.1, 999.001–999.006, 999.102, 763, 707/736, 802, 999.104; 705/8
See application file for complete search history.

(56) References Cited

U.S. PATENT DOCUMENTS

| | | | |
|---|---|---|---|
| 5,798,757 A | 8/1998 | Smith | |
| 5,832,481 A | 11/1998 | Sheffield | |
| 6,199,047 B1 | 3/2001 | Dimino et al. | |
| 6,535,883 B1 | 3/2003 | Lee et al. | |
| 6,658,622 B1 | 12/2003 | Aiken et al. | |
| 6,801,905 B2 | 10/2004 | Andrei | |
| 6,868,413 B1 | 3/2005 | Grindrod et al. | |
| 6,920,461 B2 | 7/2005 | Hejlsberg et al. | |
| 6,964,010 B1 | 11/2005 | Sharp | |
| 7,003,730 B2 | 2/2006 | Dettinger et al. | |
| 7,124,145 B2 * | 10/2006 | Surasinghe | 1/1 |
| 7,137,100 B2 | 11/2006 | Iborra et al. | |
| 7,168,035 B1 | 1/2007 | Bell et al. | |
| 7,209,911 B2 | 4/2007 | Boothby et al. | |
| 7,296,017 B2 | 11/2007 | Larcheveque et al. | |
| 2003/0115186 A1 | 6/2003 | Wilkinson et al. | |
| 2003/0154191 A1 | 8/2003 | Fish et al. | |
| 2004/0006608 A1 | 1/2004 | Swarna et al. | |
| 2004/0073868 A1 | 4/2004 | Easter et al. | |
| 2004/0162741 A1 | 8/2004 | Flaxer et al. | |
| 2005/0289517 A1 | 12/2005 | Balfe et al. | |
| 2006/0041421 A1 | 2/2006 | Ta et al. | |
| 2006/0053106 A1* | 3/2006 | Bhaghavan et al. | 707/4 |
| 2006/0074731 A1* | 4/2006 | Green et al. | 705/8 |
| 2006/0122956 A1 | 6/2006 | Shimogori | |
| 2006/0167905 A1 | 7/2006 | Liu et al. | |
| 2006/0224959 A1 | 10/2006 | McGuire et al. | |
| 2006/0253466 A1 | 11/2006 | Upton | |
| 2006/0253831 A1 | 11/2006 | Harper et al. | |
| 2007/0027847 A1 | 2/2007 | Weinberg et al. | |
| 2007/0027858 A1 | 2/2007 | Weinberg et al. | |
| 2007/0027890 A1 | 2/2007 | Poyourow et al. | |
| 2007/0028079 A1 | 2/2007 | Weinberg et al. | |

* cited by examiner

*Primary Examiner* — Cam Y Truong
*Assistant Examiner* — Cecile Vo
(74) *Attorney, Agent, or Firm* — Buckley, Maschoff & Talwalkar LLC (57) ABSTRACT

Conditionally branching a validation allows branch-specific child validations to execute based on the values of data in a specific record. This allows for example a conditional branch to call another validation to validate records having particular category field values, family values and/or audience level/name/values. Embodiments comprise an interface that assists users through the use of automatic tokenizing and/or pick lists of field names and fields values, including a measurement builder for entering legal tokenized measurement values with applicable units of measure. Embodiments of the invention allow knowledgeable users to rapidly create expressions to ensure that the legal syntax and semantics of an expression are not violated while providing the user with pick lists and measurement values within legal ranges and with applicable units of measure. Validations rules are generated and performed on desired records in a computer system database without requiring programs, scripts or queries to be written.

16 Claims, 9 Drawing Sheets

| | Check-Prir | Check SK | | SKU | Description |
|---|---|---|---|---|---|
| | | | CA (200) 135-12 | | Superia Print Film |
| | ✓ | ✓ | CA (200) 135-24 | | Superia Print Film |
| | ✓ | ✓ | CA (200) 135-36 | | Superia Print Film |
| | ✓ | ✓ | CH (400) 135-12 | | Superia Print Film |
| | ✗ | ✓ | CH (400) 135-24 | | Superia Print Film |
| | ✓ | ✓ | CH (400) 135-36 | | Superia Print Film |
| | ✓ | ✗ | CN (100) 135-12 | | Superia Print Film |
| | ✓ | ✓ | CN (100) 135-24 | | Superia Print Film |
| | ✓ | ✓ | CZ (800) 135-36 | | Superia Print Film |
| | ✓ | ✓ | EB (100) 135-24 | | Ektachrome Elite Slide Film |
| | ✓ | ✓ | EB (100) 135-36 | | Ektachrome Elite Slide Film |

| | English [US] | English [UK] | Japanese [JA] |
|---|---|---|---|
| Description | Kodachrome Professional Slide Film | Kodachrome Professional Slide Film | Kodachromeの専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダーは Excellent natural color quality with superior |
| Pictures | [Kodachrome 64 PROFESSIONAL] | [Kodachrome 64 PROFESSIONAL] | [Kodachrome 64 PROFESSIONAL] |
| Spec Sheets | | | |

Tabs: Record Detail | Language Detail | Family Detail | Validations | Workflow | Search Selections

- 800 (pointer to Description row)
- 801 Description
- 802 Category
- 803 Manufacturer
- 804 Long Description
- 805 Pictures

Figure 9

METHOD FOR CONDITIONALLY BRANCHING A VALIDATION

BACKGROUND OF THE INVENTION

1. Field of the Invention

Embodiments of the invention described herein pertain to the field of computer systems. More particularly, but not by way of limitation, one or more embodiments of the invention enable methods for conditionally branching a validation in a computer system.

2. Description of the Related Art

Known methods for creating expressions for manipulating data in a computer system require complex and error prone expression entry. Wizards exist that help a user construct an expression, however the user must still have extensive programming knowledge in order to effectively create a expression. The user must for example still understand the rules and syntax for creating a properly formed expression. Wizards help to create properly formed expressions, however known wizards are primarily concerned with aiding a user in the formatting nuances associated with complex expressions. Wizards do not allow for expressions to be used as validations with conditional branches and associated programs do not have the ability to be perform the expressions manually or automatically over selected records. Furthermore, associated programs do not show the success or failure of the expression in association with the records themselves. In addition, known expression creation tools do not allow for expressions to be grouped, do not allow for expressions to be called from workflows and do not allow for searches to be conducted or combined with other searches to find records that match the expression.

One approach for defining different validations to conditionally apply to a record is to define a different validation for each value in the records that a branch is desired on and then manually call each validation based on that value. This approach requires that separate validations must be performed one at a time. For at least the limitations described above there is a need for a method for conditionally branching a validation.

BRIEF SUMMARY OF THE INVENTION

Embodiments of the invention are directed to a method of conditionally branching a validation. Validations comprise metadata and validation rules. Validations rules are generated and performed on data, for example desired records in a computer system database, without requiring programs, scripts or queries to be written. Validation metadata comprises properties that define the validation itself, such as its name or associated groups. The validation rules are formed using tokenized inputs. This eliminates an entire class of syntax errors since the tokens are guaranteed to be properly spelled. Validation rules are also known as validation expressions. After a validation expression is created it may then be performed with respect to one or more records. A validation expression returns a Boolean result that signifies a success or failure result. A validation comprising a conditional branch may be applied to a set of records that specifies the value to branch on without identifying which child branch to execute for each record.

Conditionally branching a validation allows branch-specific child validations to execute based on the values of the data itself. This allows for example one conditional branch child validation to validate records having a particular category field and another conditional branch child validation to validate records having another category field value. In addition, conditional branches may be used to validate data specific to a family or audience as well. The conditional branch validation corresponding to the audience levels/names/values, family or category specific values allows a single parent validation to be performed on a group of records from multiple audiences, families or categories with the specific child validation automatically invoked for each record. For example a conditional branch on an audience level may specify that if the value in a field is found in the primary audience inheritance level, then a particular child validation is called while if the value in a field is found in the secondary audience inheritance level, then a different child validation is found. Similarly, conditional branches may also be performed using the actual audience name that a data value is obtained from, for example a conditional branch on the audience name "English US California Southern Middle-Aged High IQ" invokes a particular child validation for data associated with this audience. Conditionally branching on a data value itself that is audience specific is similar to branching on a category value, i.e., the actual data value determines the actual child validation that is called.

One or more embodiments of the invention comprise an interface that assists in constructing validation expressions by providing tokenized pick lists of field names and field values. In addition, a measurement builder for entering legal tokenized measurement values and dimensions with applicable units of measure further aides in the construction process. The interface also allows for conditionally branching on field values and attribute values including categories, families and audience values, names and levels. Embodiments of the invention allow knowledgeable users to rapidly create expressions to ensure that the legal syntax and semantics of an expression are not violated while providing the user with pick lists and measurement or dimension values within legal ranges and with applicable units of measure. Allowing validations to branch based on an audience values/names/levels and family or category specific field or attribute values allows a specific validation to be performed based the underlying data.

As utilized in the context of this disclosure, "fields" are associated with all records of the main data table, i.e., all records in the main data table comprise the same fields. "Attributes" are quantities that are associated with subsets of the main data table, i.e., specific to a given category which is a field in the main data table. Attributes do not reside in the main data table. Therefore, based on the value of a category field or other any other fields of the main data table, attributes may be associated with a subset of the records of the main data table. An "audience" may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. Audiences can be as complex as required to support the number of targets and number of languages, regions, religions, cultures or any other division conceivable. An audience hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. "Lookup tables" are used in order to place a text object for example in one place in the database and which are referenced by a smaller quantity, i.e., a reference identifier or key into the lookup table. Lookup tables save large amounts of space and provide benefits with regards to data integrity since a change of a value in a lookup table may be made once instead of in a million records for example.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator, function, dimension or unit names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. One or more embodiments of the invention optionally allow for the user to type in characters that automatically limit the values presented in pick lists, thereby narrowing the possible selections.

Validation expressions can be used to perform a variety of tests that implement sophisticated business logic that goes far beyond simple data integrity checks, including:
   Ensuring that non-lookup fields (fields without pick lists) have a legal value (e.g. Price>0).
   Ensuring that specific fields have non-Null values when other fields have a particular value (Price>0when Cost>0).
   Comparing the values of different fields to ensure that the relative values are legal (e.g. Price>Cost).
   Ensuring that a workflow task is not allowed to proceed until workflow related validations return successful status.

When combined with a user interface that visually displays records, a validation expression is in effect a search expression. Since a record matching a search either matches or does not match a search, the value of searching for a given value or combination of values is a Boolean. Since validations return Boolean values, i.e., TRUE and FALSE, the validation expressions described herein may be used as searches. In this manner, the creation of expressions for searching for particular records does not have to be duplicated within a separate search facility since the records that successfully match a validation or fail a validation are defined by the validation expression itself. A drill down search for example may make use of a validation for further drilling down into a database. For example, by dragging and dropping a validation into a search pane further drill down into the records is achieved. Any other method of instantiating validations to further limit a search are in keeping with the spirit of the invention. A Validation vertical tab may comprise a list of validations or a list or tree of the validations within validation groups that can be asserted to provide further limiting of the category or manufacturer or free-form searches for example.

Using a conditional branch as a search filter returns different records based on the records selected for search. By selecting different records and maintaining the same search filters, entirely different search results may appear. For example a conditional branch that branches on a category may have a first child branch for category "shoes" that searches for shoes of a given size and a second child branch for category "swimsuits" that searches for swimsuits of a given pattern. When applied to a drill down search on category, manufacturer or free-form or any combination thereof, the final results in this case would depend on the category being searched on. It does not make sense to search for patterns associated with shoes. The ability to conditionally branch validations on family values and on audience names, levels and values showing through certain fields provides extreme flexibility in searching for data.

BRIEF DESCRIPTION OF THE DRAWINGS

The above and other aspects, features and advantages of the invention will be more apparent from the following more particular description thereof, presented in conjunction with the following drawings wherein:

FIG. 5 illustrates an embodiment of the choices available for branching including categories, families and for a chosen field the audience level, audience name, or audience specific value used to fill that field based on a target audience with which to view the field from.

DETAILED DESCRIPTION

A method for conditionally branching a validation will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Validations comprise metadata and validation rules. Validations rules are generated and performed on data, for example desired records in a computer system database, without requiring programs, scripts or queries to be written. Validation metadata comprises properties that define the validation itself, such as its name or associated groups. The validation rules are formed using tokenized inputs. This eliminates an entire class of syntax errors since the tokens are guaranteed to be properly spelled. Validation rules are also known as validation expressions. After a validation expression is created it may then be performed with respect to one or more records. A validation expression returns a Boolean result that signifies a success or failure result.

A validation comprising a conditional branch may be applied to a set of records without identifying which child branch to execute for each record. Conditionally branching a validation allows branch-specific child validations to execute based on the values of the data itself. This allows for example a conditional branch to validate records having different category field values with different child validations. In addition, conditional branches may be used to validate data specific to a family or audience as well. The conditional branch validation corresponding to the audience levels/names/values, family or category specific values allows a single parent validation to be performed on a group of records from multiple audiences, families or categories with the specific child validation automatically invoked for each record. For example a conditional branch on an audience level may specify that if the value in a field is found in the primary audience inheritance level, then a particular child validation is called while if the value in a field is found in the secondary audience inheritance level, then a different child validation is found. Similarly, conditional branches may also be performed using the actual audience name that a data value is obtained from, for example a conditional branch on the audience name "English US California Southern Middle-Aged High IQ" invokes a particular child validation for data associated with this audience. Conditionally branching on a data value itself that is audience specific is similar to branching on a category value, i.e., the actual data value determines the actual child validation that is called.

One or more embodiments of the invention comprise an interface that assists in constructing validation expressions by providing tokenized pick lists of field names and field values. In addition, a measurement builder for entering legal tokenized measurement values and dimensions with applicable units of measure further aides in the construction process. The interface also allows for conditionally branching on field values and attribute values including categories, families and audience values, names and levels. Embodiments of the invention allow knowledgeable users to rapidly create expressions to ensure that the legal syntax and semantics of an expression are not violated while providing the user with pick lists and measurement or dimension values within legal ranges and with applicable units of measure. Allowing validations to branch based on an audience values/names/levels and family or category specific field or attribute values allows a specific validation to be performed based the underlying data.

Figure 1:
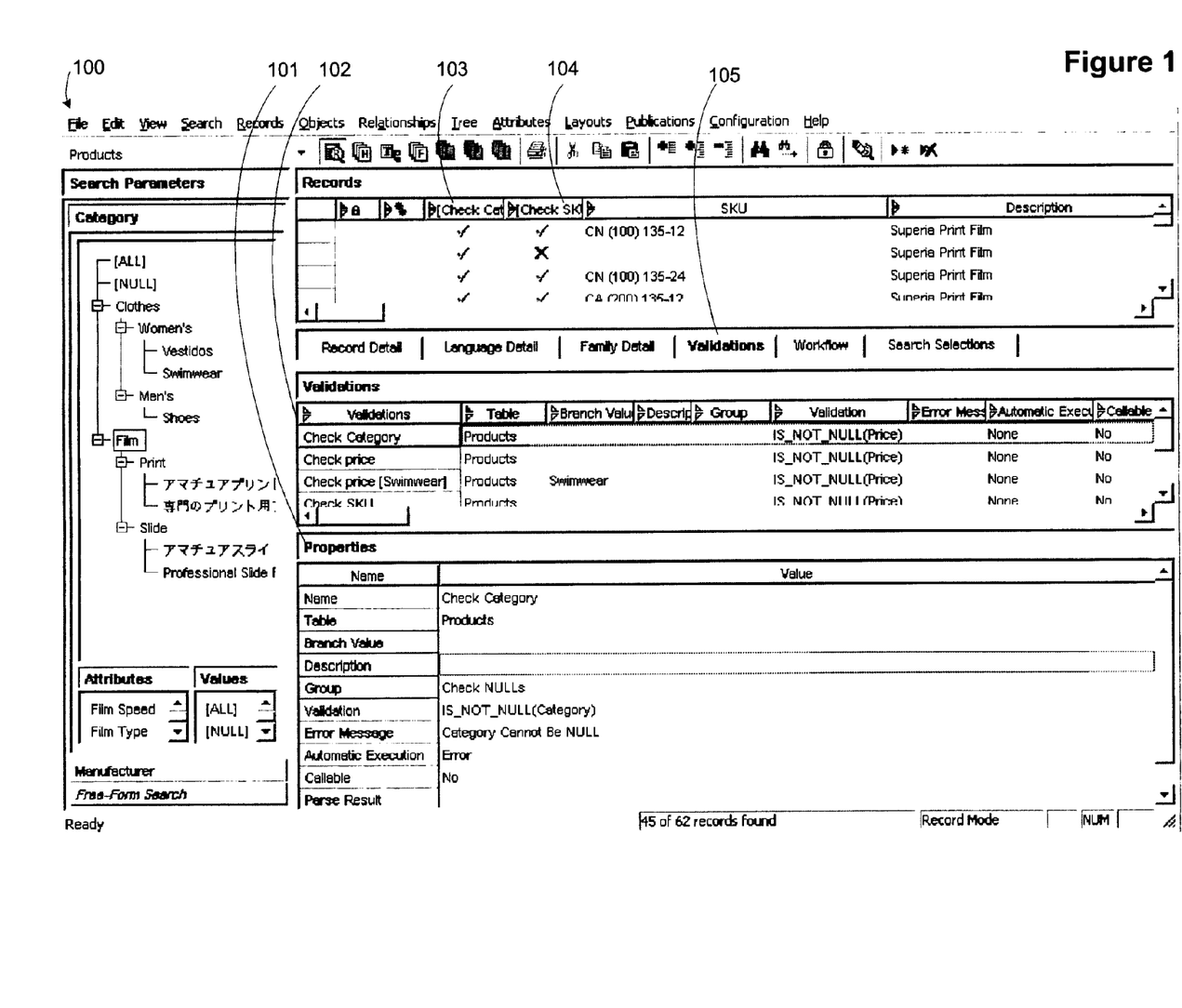
FIG. 1 illustrates an embodiment of an application comprising a validation metadata user interface.

FIG. 1 illustrates an embodiment of an application comprising a validation metadata user interface. The elements in application 100 comprise a validation tab 105 comprising rows of validations 102, each of which extends horizontally showing the name of the validation (e.g., "Check Category", "Check Price", "Check Price[Swimwear]", "Check SKU"), the table(s) associated with the validation, the branch value(s) used for branching the validation, a description of the validation, the group(s) that the validation is associated with, the validation expression, an error message to display when the validation fails, an automatic execution value of none, warning or error, a callable flag for determining if the validation is callable from another validation and a parse result read-only success or failure field that shows the results of parsing the validation expression. The properties of a selected validation, in this case the "Check Category" row in rows of validations 102 are shown in validation properties edit area 101. Each row in validation properties edit area 101 corresponds to each column in rows of validations 102. Each row in validation properties edit area 101 is edited by clicking the mouse in the corresponding row and entering information. The result of executing a validation or validation group is shown as a column in the records list, for example "[Check Category]" 103 and "[Check SKU]" 104 showing the status of each validation for example as will be described further below.

A validation expression may be performed manually or automatically. When a validation expression is performed with respect to one or more records, the success or failure may be indicated for each record in an interface. A validation expression may be performed automatically for a database update to warn against or prevent the entry of invalid data and ensure data integrity. A validation expression may also be automatically performed from one or more workflows to implement a business process with system-enforced data integrity. The validation metadata may comprise a setting that signifies the level of execution as being warning and error. Executing the validation refers to executing the validation expression. Any method of executing the validation or validation expression is in keeping with the spirit of the invention.

A validation expression may be placed into one or more groups and performed as a group with the success or failure indicated for each record for example visually. Each validation group is a set of validations that can be performed as a group as a single operation rather than requiring each individual validation to be separately performed. Validation groups allow for the organized use of large sets of related validations, eliminating the likelihood of forgetting to perform any of the individual validations in the group. For example, Trading Partner X may have a total of 125 validations while Trading Partner Y has a total of 143 validations, many of them in common with Trading Partner X. When a validation group is performed against a set of records, each individual validation in the group is performed, and an individual success or failure result for each validation for each record is generated.

An individual validation or validation group is performed manually by selecting one or more records to validate, right-clicking on one of the records and choosing validations from the context menu. Alternatively, choosing Records>Validations from the main menu also performs an individual validation or validation group. One embodiment of the execution menu comprises an execute menu item and an execute group menu item. Upon choosing execute or execute group, a second level of menu items appears comprising the names of the validations to perform. The specified validation or validation group is then performed and a message dialog is displayed indicating success or failure. The validations that are executed are shown as columns in the records area as previously described in one or more embodiments of the invention.

Validation groups may be organized into a hierarchy. A validation group hierarchy is similar to a data group hierarchy in that it does not show up in the drop-down list of tables and cannot be edited directly. Instead, the validation group hierarchy may be edited in one or more embodiments of the invention using a tree view user interface element or any other type of interface element capable of displaying a hierarchy. For example, the hierarchy may then be modified using a context menu editable tree to add siblings and children, and to delete and rename existing nodes.

Figure 2:
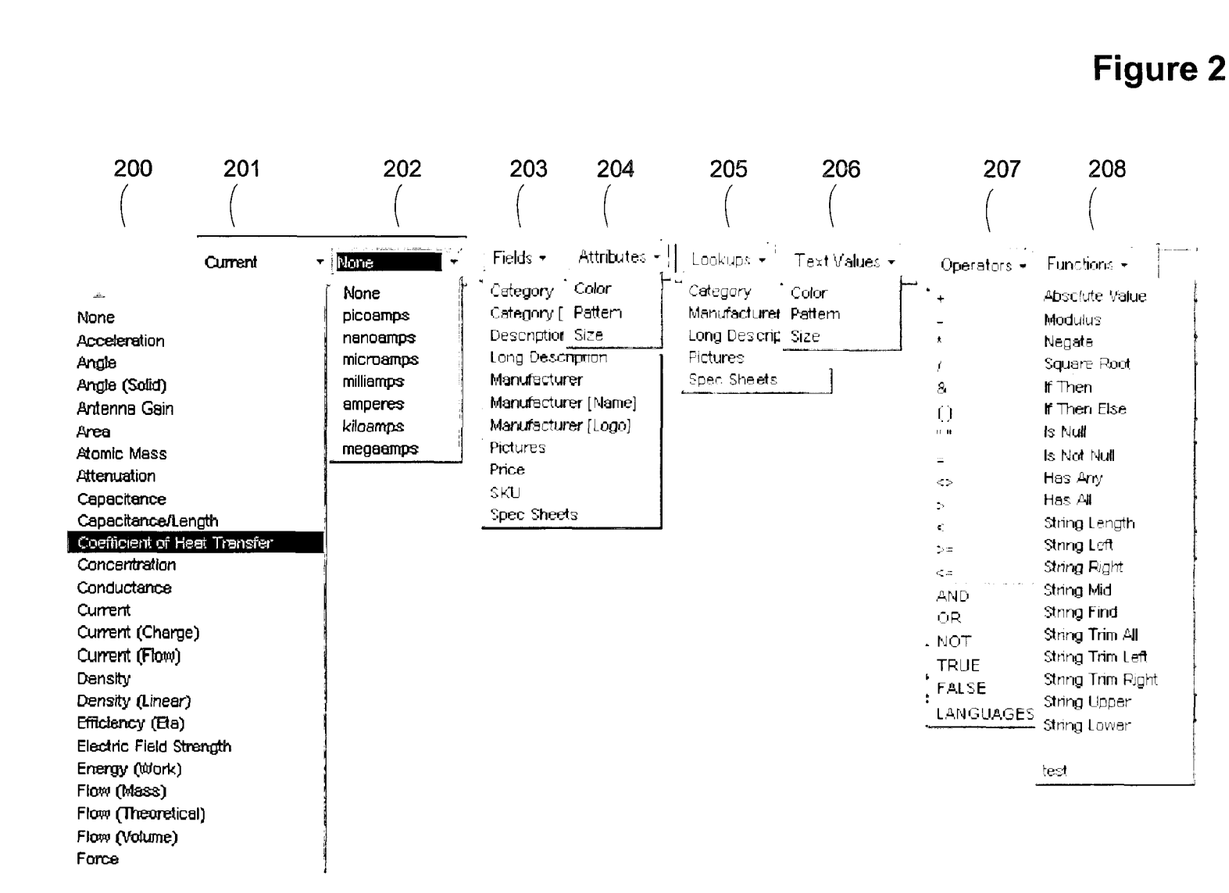
FIG. 2 illustrates embodiments of the inputs in exploded format that are shown in the validation expression builder interface of FIG. 3.
Figure 3:
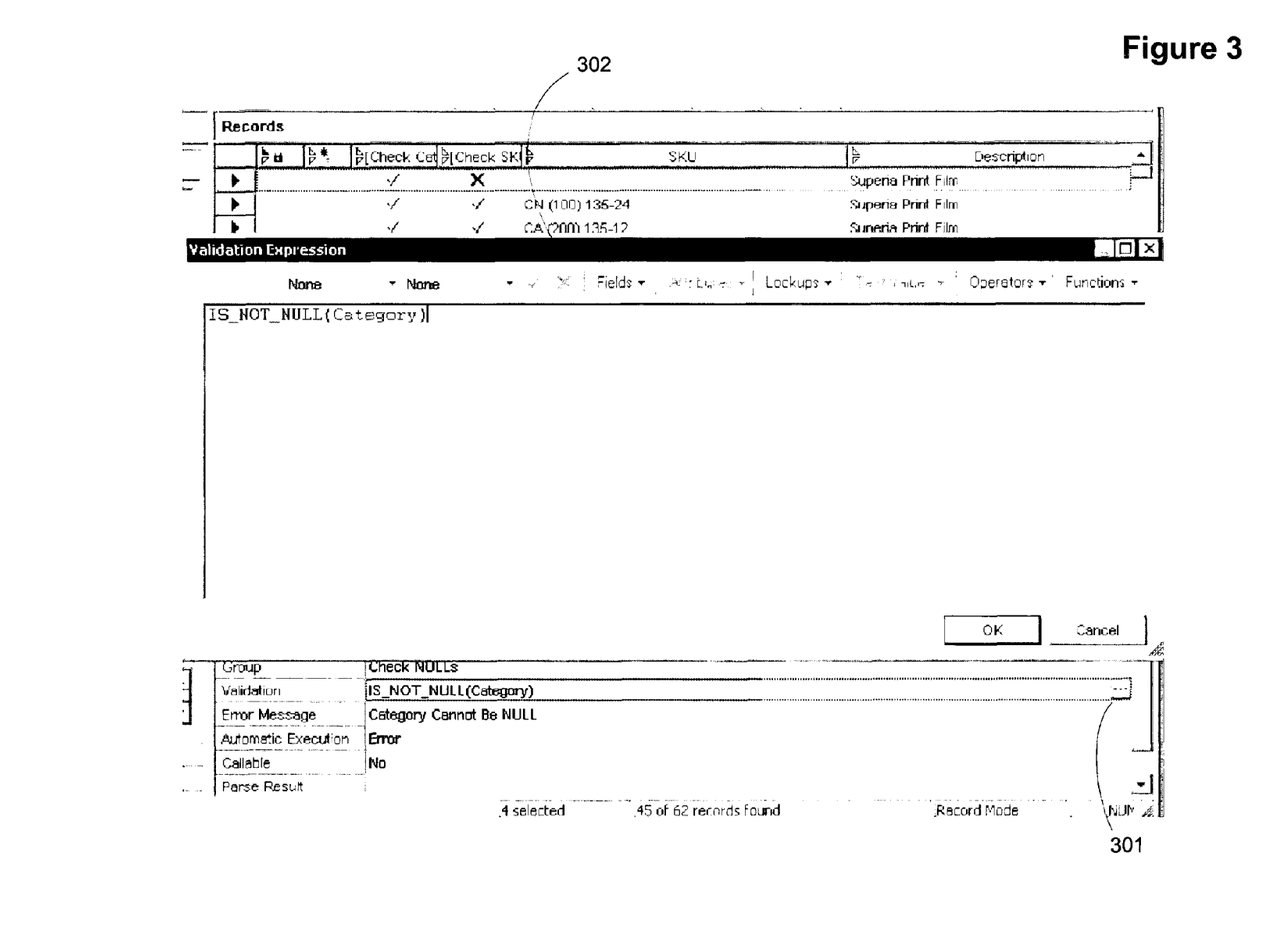
FIG. 3 illustrates an embodiment of the validation expression builder user interface.

FIG. 3 illustrates an embodiment of the validation expression builder user interface 302 that is invoked when ellipsis interface element 301 is asserted. The elements along the interface include a numeric measure value text field input, dimension input, unit of measure input, field input, attribute input, lookup input, text value input, operator input and function input. Through use of tokenized values for dimensions, units of measure, fields, attributes, lookups, text values, operators and functions, a large body of errors associated with manual expression entry is eliminated from the validation expression generation process. Each of these input fields are shown exploded in FIG. 2. The elements include numeric measure value input 200, dimension input 201 with a partial list of dimensions shown, unit input 202 corresponding to the current setting of dimension set via dimension input 201, field input 203 comprising the fields in the main table, attribute input 204 corresponding to the attributes available based on the selected records, lookup input 205, text value input 206 for obtaining text values for defined attributes, operator input 207 and function input 208. By entering selections into these inputs, an expression is built. Generally the only text based input that is used is when entering a number into numeric measurement value input 200. Eliminating entry of expressions through character based input reduces the number of errors in the finished expressions. In addition, by having pre-defined tokens that are enabled or disabled as the system accepts user input based on the expression as it is built, syntax errors are greatly reduced. The system provides values to the user so that the user does not have to guess what the table, field, attributes, lookup values or operator and function values should be.

Validation execution results in different behaviors based on the level of execution of the validation. For example, in one level a validation execution can be designated as a warning validation. In this mode a warning is displayed to a user before saving a record if a validation fails, although the record update still occurs. In another level of execution, a validation execution may be designated as an error validation for example. In this mode, the user interface displays the error and also prevents the record from being saved if a validation fails, i.e., if the Boolean value returned from the validation is FALSE. For validation groups, the final outcome of multiple validations are the results of each and every validation, so if any of the validations in a group fails, and the level of execution for the failed validation is warning level, then the warning is displayed and if the level of execution for another failed validation is error level, then the error is displayed and the update does not occur with respect to the data record that the validation refers to. Other embodiments of the invention may perform short circuit checking and display only the first error encountered in case of a large amount of validation errors related to one element. This saves the user from interacting with a multiplicity of error dialogs for example. Other embodiments of the invention may utilize a global level of execution for a validation group so that if any validation in the group fails, the whole group fails which prevents any of the updates associated with the group from occurring. Any other method of combining the results of the validations in a validation group are in keeping with the spirit of the invention.

Figure 6:
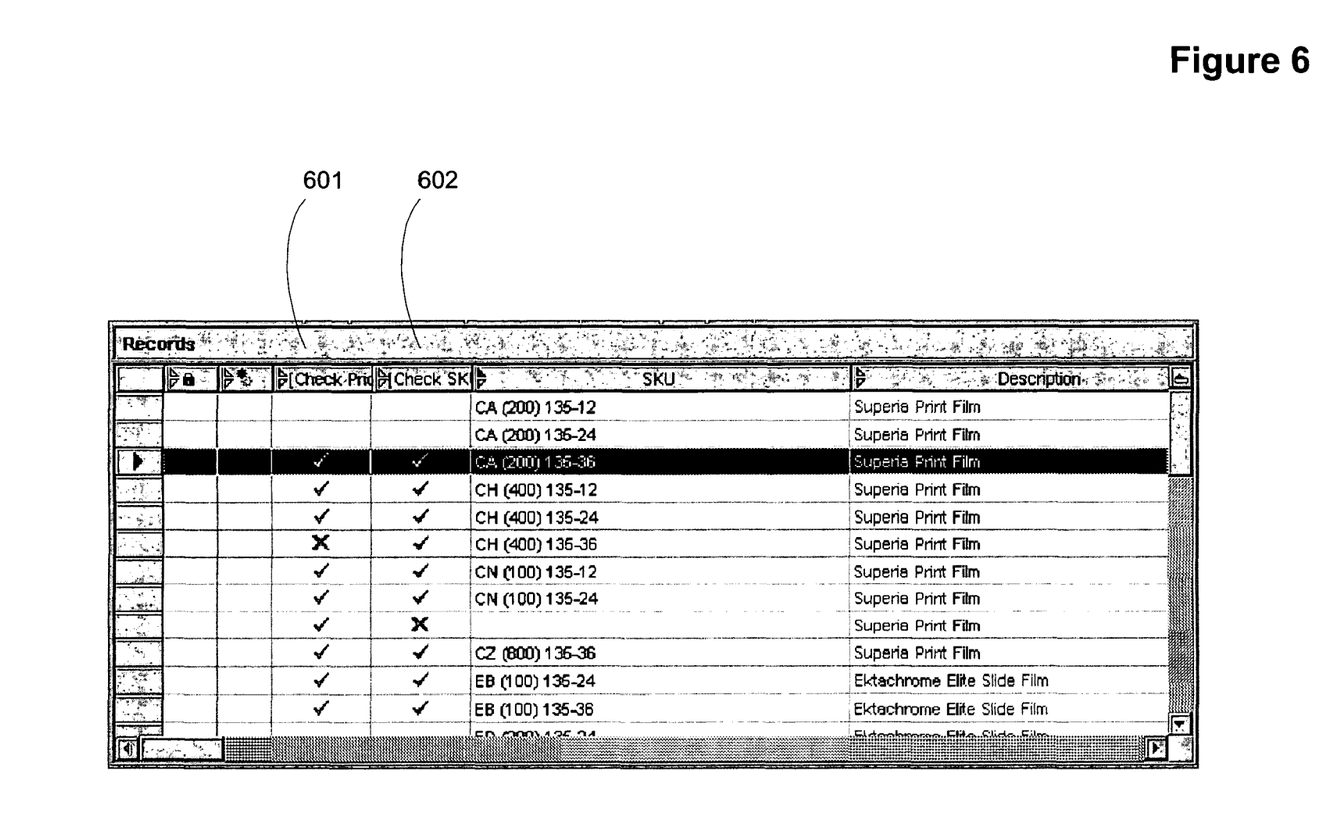
FIG. 6 illustrates an embodiment of the record details user interface comprising columns representing validation results.
Figure 7:
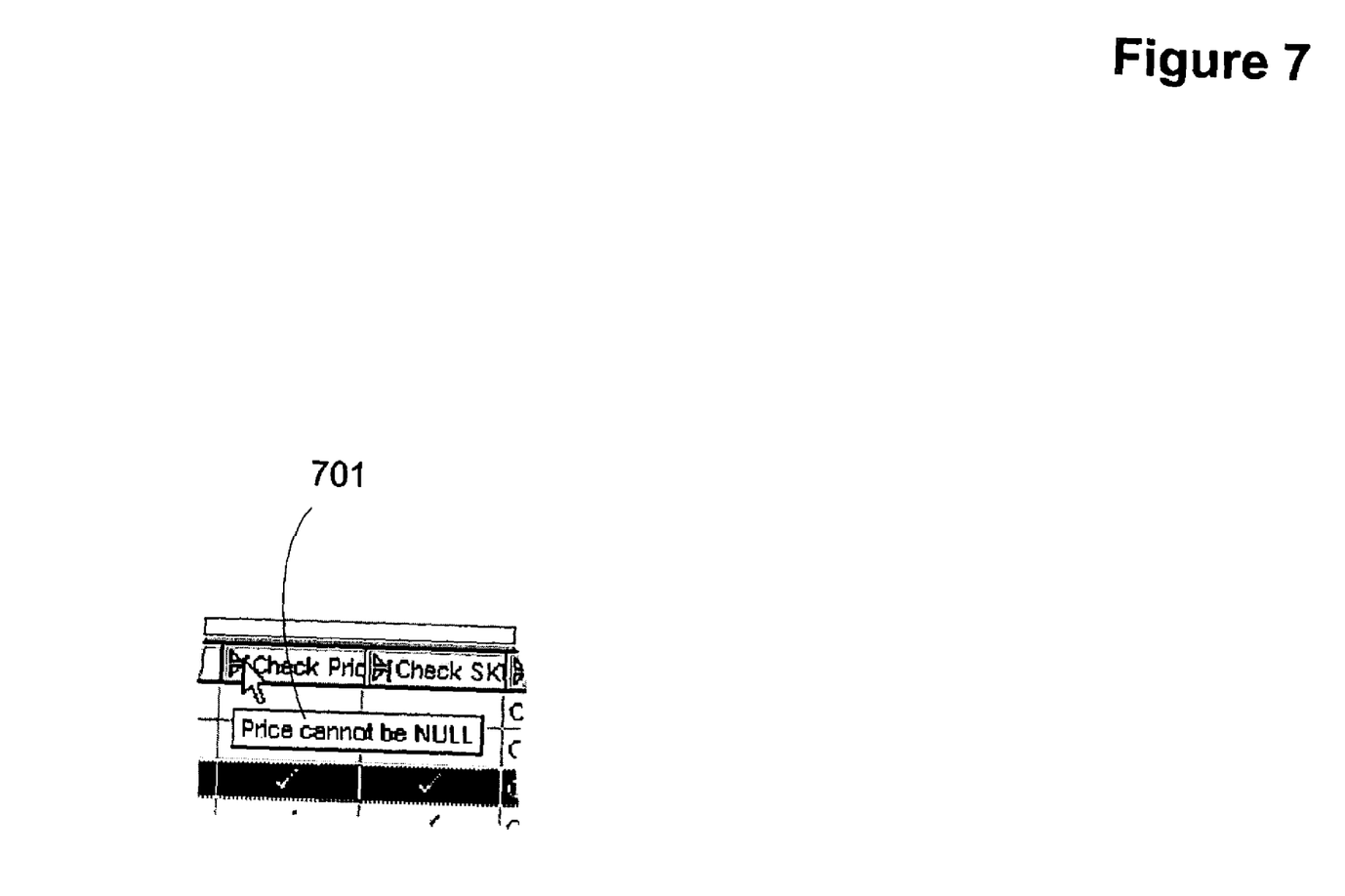
FIG. 7 illustrates a portion of an embodiment of the record details user interface comprising a tooltip showing a warning message associated with the validation result associated with the column.

After performing a validation, a column may be added to the display of records for each validation indicating success or failure for that validation for each and every record, as shown in FIG. 6. Each validation result column may be named with the validation name in square brackets ([]) to denote that the column is not actually a field in the record. Naming the columns in this manner is not a requirement but simply signifies that the column is not a field in the database. Each validation result Boolean (TRUE or FALSE) value may be shown as check marks for TRUE or X's for FALSE results in the column, any other method of showing TRUE and FALSE values is in keeping with the spirit of the invention. When the mouse pointer is moved over the column title, a tooltip may be displayed showing the error message associated with the validation, as shown in FIG. 7. Any other method of showing the error associated with a validation column is in keeping with the spirit of the invention. Each validation result column may be sorted to group records that failed or succeeded with respect to the validation. Each record may then be edited to correct observed error(s). Sorting the columns may be performed by clicking on the column header. Clicking a second time on the column header switches the order of the records from ascending to descending with respect to the value in the field. See FIG. 7, by clicking at the location of the pointer the validation column is sorted with correctly validating rows separated from records that fail validation. Clicking again in the column header switches the uppermost records (for example the correctly validating records) with the lowermost records (for example the records failing validation).

When combined with a user interface that visually displays records, a validation expression is in effect a search expression. Since a record matching a search either matches or does not match a search, the value of searching for a given value or combination of values is a Boolean. Since validations return Boolean values, i.e., TRUE and FALSE, the validation expressions described herein may be used as searches. In this manner, the creation of expressions for searching for particular records does not have to be duplicated within a separate search facility since the records that successfully match a validation or fail a validation are defined by the validation expression itself. A drill down search for example may make use of a validation for further drilling down into a database. For example, by dragging and dropping a validation listed in rows of validations 102 to the search parameters pane in the leftmost tree view in FIG. 1, further drill down into the records shown in the upper right portion of FIG. 1 is achieved. By performing a SHIFT-drag and drop of the validation listed in rows of validations 102 into the search parameters pane in the leftmost tree view in FIG. 1, the validations that fail are drilled down into. Another embodiment of the invention makes the default drag and drop action correspond to drilling down into records that fail validation and conversely SHIFT-drag and drop allows for records that correctly validate to be drilled down. Any other method of instantiating validations to further limit a search are in keeping with the spirit of the invention including use of another vertical tab named "Validation", i.e., in addition to the "Category", "Manufacturer" and "Free-Form Search" vertical tabs on the left side of FIG. 1 from which to select validations to use for searching. A Validation vertical tab may comprise a list of validations or a list or tree of the validations within validation groups that can be click on to provide further limiting of the category or manufacturer or free-form searches. The Category vertical pane shown in FIG. 1 with the tree view is a hierarchical split of the main data table for example a product table into a taxonomy of products. By clicking in the tree, all of the records that belong to that portion of the taxonomy are displayed in the upper right portion of FIG. 1, the record list. The Manufacturer vertical tab, when asserted, displays a manufacturer pane that lists all of the manufactures in the main data table, i.e., the manufacturers of the products that are listed in the main data table. Combining these is one method of creating a hierarchical family taxonomy that builds on the existing category hierarchy in the main data table.

Using a conditional branch as a search filter returns different records based on the records selected for search. By selecting different records and maintaining the same search filters, entirely different search results may appear. For example a conditional branch that branches on a category may have a first child branch for category "shoes" that searches for shoes of a given size and a second child branch for category "swimsuits" that searches for swimsuits of a given pattern. When applied to a drill down search on category, manufacturer or free-form or any combination thereof, the final results in this case would depend on the category being searched on. It would not make sense to search for patterns associated with shoes. The ability to conditionally branch validations on family values and on audience names, levels and values showing through certain fields provides extreme flexibility in searching for data.

Figure 8:
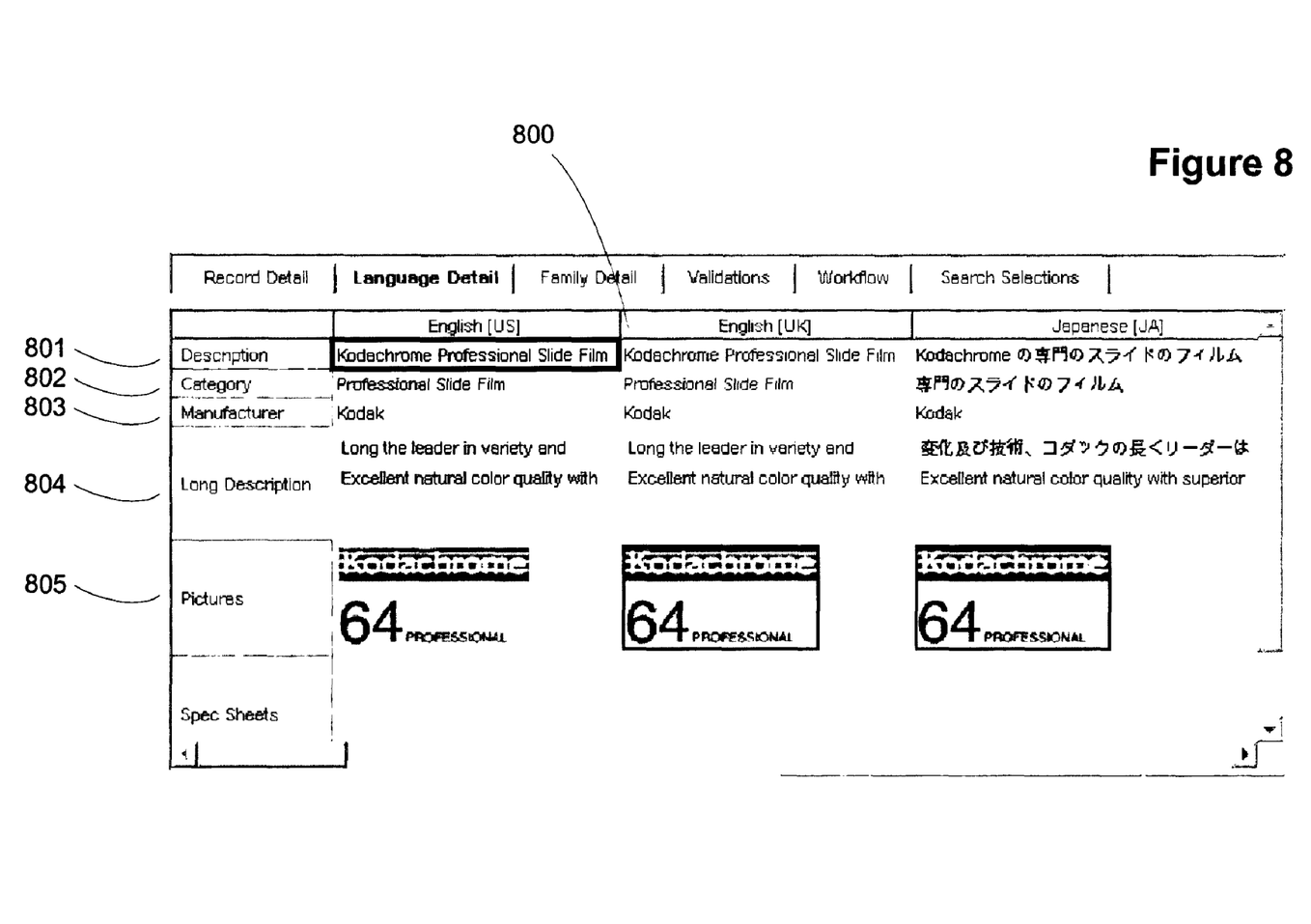
FIG. 8 illustrates an embodiment of the audience user interface pane.

FIG. 8 illustrates an embodiment of the audience user interface an embodiment of which has been simplified to be language and country specific. Audience pane 800, comprises a horizontal set of columns that represent the supported audiences and with a vertical axis display each field for selected records comprising fields named description 801, category 802, manufacturer 803, long description 804 and pictures 805. For each field, any value that is not found in the leftmost column, e.g., "English [US]", is taken from the next column to the right. In addition, the record interface may display each of the primary level of inheritance fields in black and the inherited fields in other colors or bold to show that they are inherited and are not found with respect to the audience through which the user has chosen to view the data with. Other methods of forming a hierarchy of audiences that is not table specific are in keeping with the spirit of the invention, such as forming a hierarchy of audiences in a table or tree.

Figure 4:
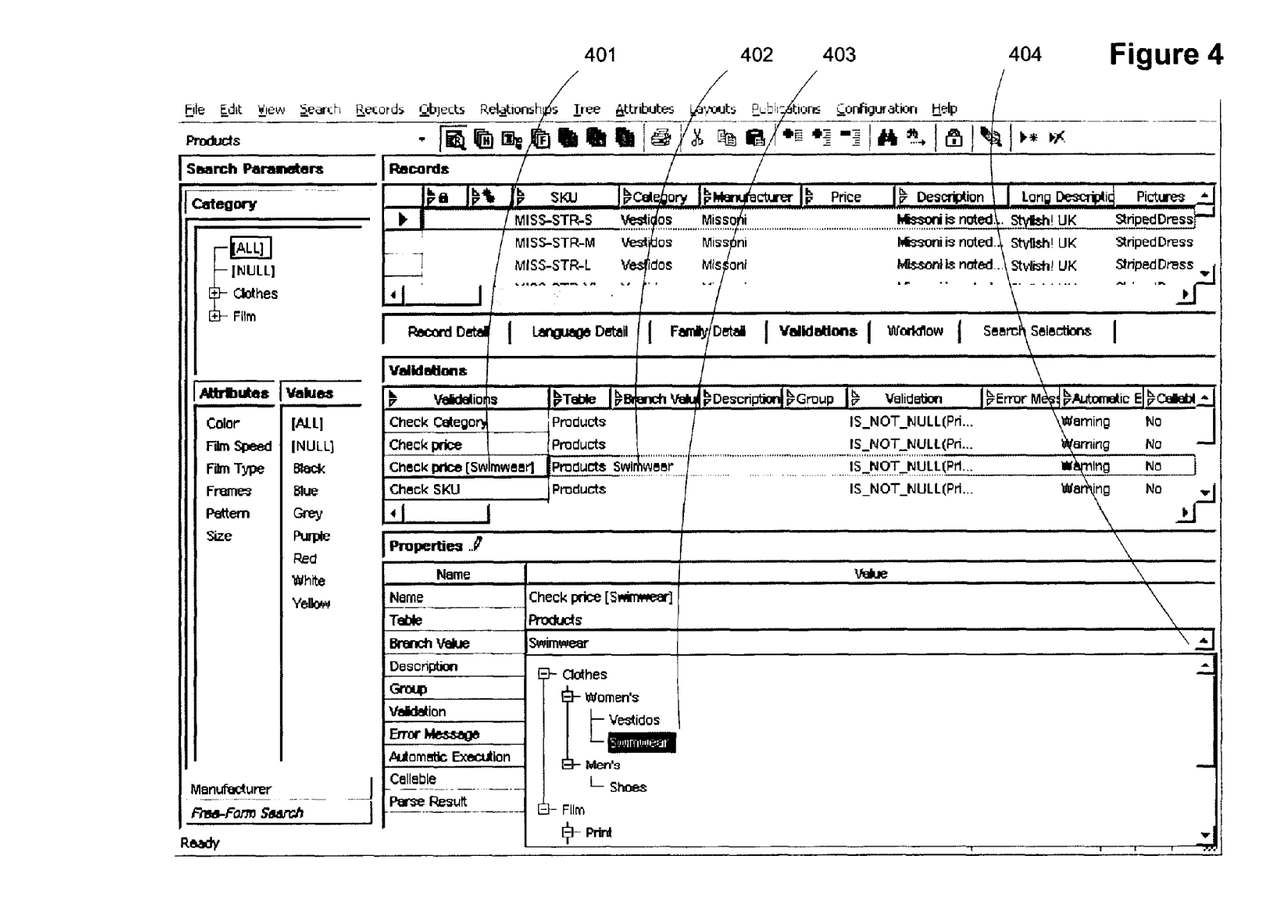
FIG. 4 illustrates an embodiment of the branch chooser interface.

FIG. 4 illustrates an embodiment of the branch chooser interface. Validation 401 "Check price [Swimwear]" is shown as a row in the Validations pane in the middle right portion of the figure. The row is selected and is shown with the columns "Table" showing that the "Products" table as the table that the validation is to operate on. The second column is the "Branch Value" column and shows the item that the conditional branch is using to conditionally branch based on the selected record, field or attribute. The next column is the "Group" column followed by the "Validation" column showing the first portion of the validation expression. The next column is the "Error Message" column that shows the error or warning message that is displayed if the validation fails. The next column is the "Automatic Error" column showing the level of execution of the validation and may comprise warning level, error level (or optionally "none" for not showing warnings or errors). The next column is the "Callable" column which is used to set a validation as callable from another validation. In order to set or alter branch value 402, the branch chooser interface is invoked by clicking on widget 404 although any method of displaying the branch chooser interface is in keeping with the spirit of the invention. The particular item to choose in order to conditionally branch is then selected in one or more embodiments of the invention by selecting the item from a tree. Branch value 403 "Swimwear" for example is used to conditionally branch a validation so that any record having a category of "Swimwear" will branch to this child validation from the parent validation "Check Price". Any method of associating a parent validation with a child validation is in keeping with the spirit of the invention including utilizing the name of the parent validation with a branch value in quotes in order to determine if child validations exist and the correct child validation to execute.

Figure 5:
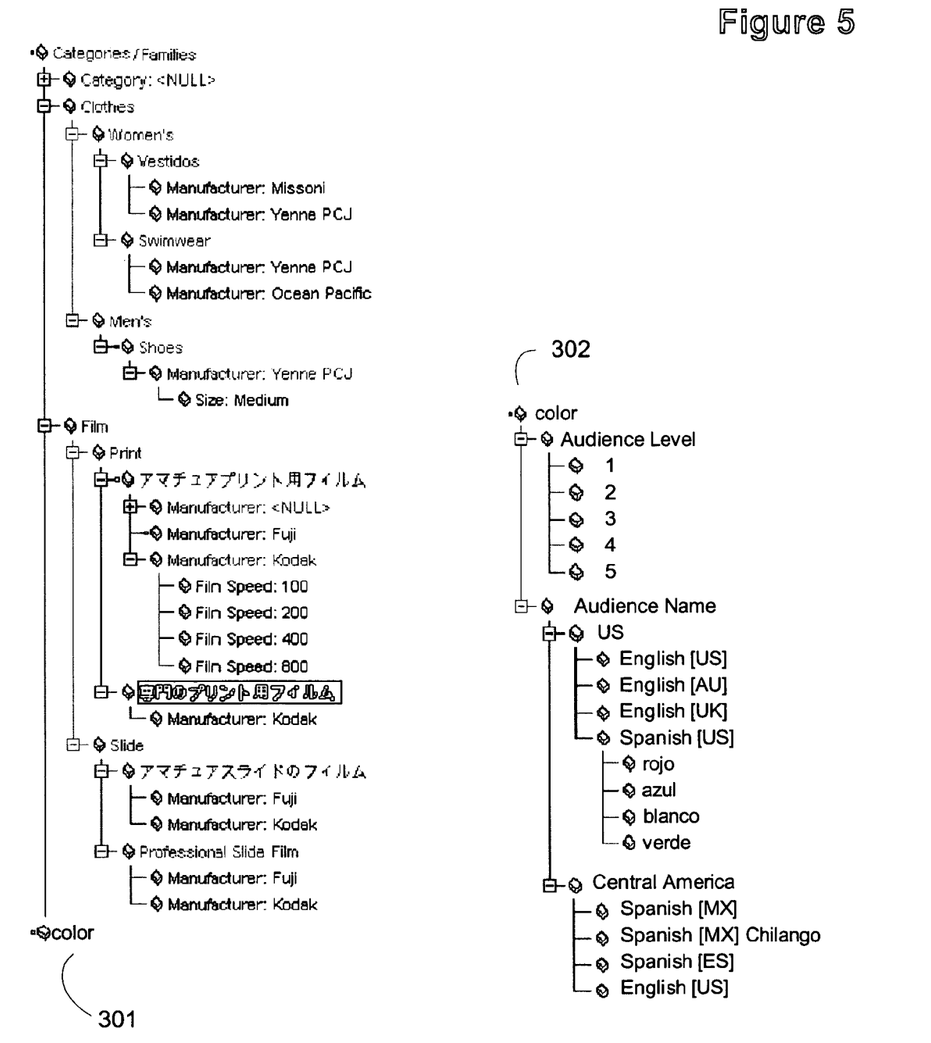

FIG. 5 illustrates an embodiment of the choices available for branching including categories, families and for a chosen field the audience level, audience name, or audience specific value used to fill that field based on a target audience with which to view the field from. This tree (although split into two portions to fit in the figure) is the tree that is available in the branch chooser interface where "Swimwear" was selected in FIG. 4. In this embodiment, not only are categories available, but also families (which are built on the category taxonomy) and audience specific branch elements such as the audience level that a given field or attribute is obtained from, the audience name associated with the audience level that a given field or attribute is obtained from and the actual lookup values for a given audience associated with a given field or attribute. In this example, The categories/families comprise NULL (so that validation can be performed on records that have yet to define a category for example), and the category may be selected by selecting "Clothes", "Clothes>Women's", "Clothes>Women's>Vestidos" and on the same level as "Vestidos", "Swimwear". Going down one more layer enters the family level of partitioning, and although the combination of category and manufacturer may form the family hierarchy in a given implementation, it is also possible to add families that are deeper. For example, the family "Clothes>Men's>Shoes>Yenne PCJ>Medium" is a family that also adds the attribute size to the family above it to form a sub-family. For a record selected in the top right portion of FIG. 1 that is associated with the attribute "color", the attribute(s) are shown at 301. In this example, the size and pattern attributes are not shown for ease of illustration. The color attribute at 301 is shown exploded at 302 so as to fit on the page. In this case a given attribute may be conditionally branch on by selecting the audience level that is being used to obtain the audience specific data item from (here 1 through 5 levels are defined in the audience hierarchy for the audience setting used to view the system from). Selecting level 3 for example means that if there is a data item that is obtained from the third level regardless of the audience level used to view the data a conditional branch occurs. Selecting an Audience Name (found beneath the Audience Level numbers) allows for validation to branch if the audience name being used to obtain a data item from is "English [UK]" for example (third level under audience "US"). Choosing a attribute value under a given audience corresponding to color attribute 301, such as is shown under the "Spanish [US]" audience, e.g., "rojo", "azul", "blanco" or "verde" signifies that a branch is taken if one of these values is selected and the data item that is obtained for a given attribute associated with a record is of this value when the corresponding audience is being used to obtain the data item (in this case "Spanish [US]"). Although these audiences are shown as single level for simplicity with their corresponding hierarchy beneath them in a list, (e.g., "US" and "Central America"), any level of audiences may be utilized in keeping with the spirit of the invention including partitions involving regions, religions, languages, monetary or any other possible division.

Figure 9:
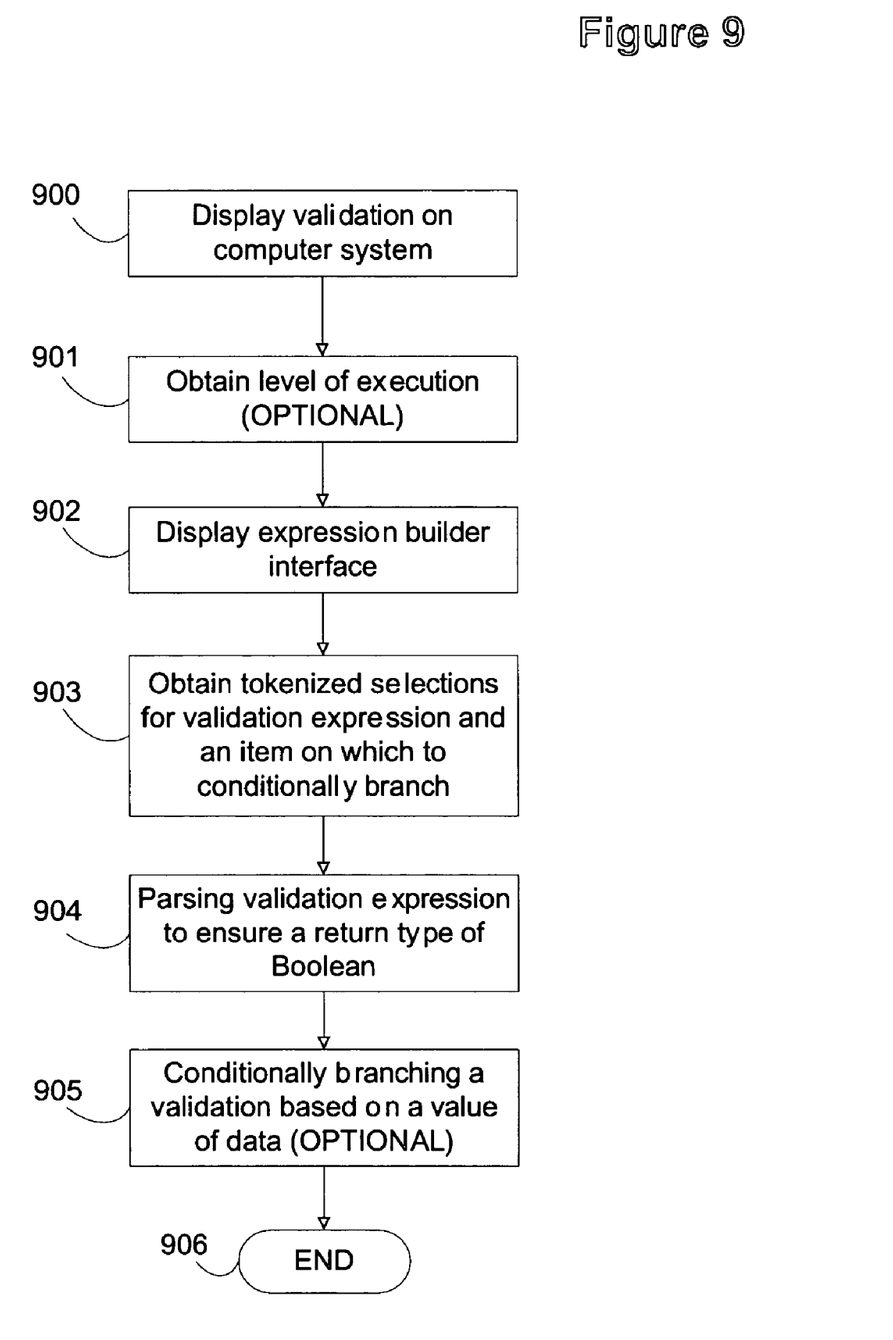
FIG. 9 illustrates a flowchart showing an embodiment of the invention for conditionally branching a validation.

FIG. 9 illustrates a flowchart showing an embodiment of the invention for conditionally branching a validation. A validation is displayed at 900, the properties of the validation may be viewed and edited at this time, or the validation may be displayed to a software module programmatically. The level of execution is optionally obtained at 901 which comprises selecting warning level or error level. Any other granularity of levels may be implemented in keeping with the spirit of the invention such as "none" which will not show any warning or error level for example. The validation expression builder interface is displayed at 902. The system obtains tokenized selections from a user or other program at 903 and the system obtains an item on which to conditionally branch. The validation expression and conditional branch are obtained without requiring character by character typing or syntax knowledge. The validation expression is parsed at 904 to ensure that the expression correctly parses and primarily to ensure that the expression returns a type of Boolean. The validation is executed during which a conditional branch is performed based on the value of a data item at 905. The conditional branch may utilize a data item such as a category, family or audience level, name or value associated with a record, field or attribute.

U.S. Pat. No. 6,754,666 entitled "Efficient Storage And Access In A Database Management System" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 11/142,809, entitled "Multi-Layered Data Model for Generating Audience Specific Documents" filed May 31, 2005, U.S. patent application Ser. No. 11/141,984 entitled "Interface for Indicating the Presence of Inherited Values in a Document" filed May 31, 2005 are all hereby incorporated herein by reference and used in combination with the embodiments of the invention enabled herein.

While the invention herein disclosed has been described by means of specific embodiments and applications thereof, numerous modifications and variations could be made thereto by those skilled in the art without departing from the scope of the invention set forth in the claims.

What is claimed is:

1. A method for conditionally branching a validation in a computer system comprising:
    displaying a validation metadata user interface on a computer system, wherein said validation metadata user interface is configured to display at least one conditional validation expression comprising an operation to perform on a set of records of a plurality of audience layers, configured to inherit data based on an audience hierarchy such that entries not found in one audience layer are automatically obtained from another audience layer, based on a branch value;
    generating at least one token-based menu comprising a drop-down list of at least one token corresponding to a field or attribute of said plurality of audience layers;
    displaying an expression builder user interface comprising said at least one token-based menu;
    obtaining at least one audience name identifying an audience level of the audience hierarchy utilized in obtaining data for a validation expression comprising at least one tokenized branch value from said token-based menu;
    parsing said validation expression including said at least one audience name to ensure that a Boolean result value is returned upon execution of said validation expression;
    grouping said validation expression into a validation group comprising a plurality of validation expressions performable as a single operation; and
    using said validation group, including the at least one audience name, as a search filter for the plurality of audience layers.

2. The method of claim 1 wherein said at least one audience name further comprises a field or attribute associated with an audience.

3. The method of claim 1 wherein said at least one audience name further comprises a hierarchical family value.

4. The method of claim 1 wherein said at least one audience name further comprises a category value.

5. The method of claim 1 further comprising:
    performing a drill-down search using said validation expression, wherein said drill-down search is limited by said at least one audience name and a hierarchal search tool.

6. The method of claim 1 further comprising:
    performing a drill-down search using said validation expression, wherein said drill-down search is limited by said at least one audience name and a free form search tool.

7. The method of claim 1 further comprising:
    configuring said validation expression for execution as part of a workflow.

8. The method of claim 1 further comprising:
    forming a hierarchy comprising said at least one validation expression.

9. A method for performing expression-based validation in a computer system comprising:
    displaying a validation metadata a user interface on a computer system, wherein said validation metadata user interface is configured to display at least one conditional validation expression comprising an operation to perform on a set of records of a plurality of audience layers, configured to inherit data based on an audience hierarchy such that entries not found in one audience layer are automatically obtained from another audience layer, based on a branch value;
    generating at least one token-based menu comprising a drop-down list of at least one token corresponding to a field or attribute of said plurality of audience layers;
    displaying an expression builder user interface comprising said at least one token-based menu;
    obtaining a level of execution for said validation wherein said level of execution comprises a plurality of levels including warning and error;
    obtaining at least one audience name identifying an audience level of the audience hierarchy utilized in obtaining data for a validation expression comprising at least one tokenized branch value from said token-based menu;
    parsing said validation expression including said at least one audience name to ensure that a Boolean result value is returned upon execution of said validation expression;
    grouping said validation expression into a validation group comprising a plurality of validation expressions performable as a single operation; and
    using said validation group, including the at least one audience name, as a search filter for the plurality of audience layers.

10. The method of claim 9 wherein said at least one audience name further comprises a field or attribute associated with an audience.

11. The method of claim 9 wherein said at least one audience name further comprises a hierarchical family value.

12. The method of claim 9 wherein said at least one audience name further comprises a category value.

13. The method of claim 9 further comprising:
    using said validation expression comprising said at least one audience name as a search filter.

14. The method of claim 13 further comprising:
    performing a drill-down search using said validation expression, wherein said drill-down search is limited by said at least one branch value selection and a hierarchal search tool.

15. The method of claim 9 further comprising:
performing a drill-down search using said validation expression, wherein said drill-down search is limited by said at least one branch value selection and a free form search tool.

16. A method for performing expression-based validation in a computer system comprising:
displaying a validation metadata user interface on a computer system, wherein said validation metadata user interface is configured to display at least one conditional validation expression comprising an operation to perform on a set of records of a plurality of audience layers, configured to inherit data based on an audience hierarchy such that entries not found in one audience layer are automatically obtained from another audience layer, based on a branch value;
generating at least one token-based menu comprising a drop-down list of at least one token corresponding to a field or attribute of said plurality of audience layers;
displaying an expression builder user interface comprising said at least one token-based menu;
obtaining at least one audience name identifying an audience level of the audience hierarchy utilized in obtaining data for a validation expression comprising at least one tokenized branch value from said token-based menu;
parsing said validation expression including said at least one audience name to ensure that a Boolean result value is returned upon execution of said validation expression; and,
branching based on said branch value selection during execution of said validation expression based on a value of data;
grouping said validation expression into a validation group comprising a plurality of validation expressions performable as a single operation; and
using said validation group, including the at least one audience name, as a search filter for the plurality of audience layers.

* * * * *